Aug. 18, 1959  J. A. RADO  2,900,440
CHROMINANCE-SIGNAL DETECTOR
Filed Aug. 31, 1954

United States Patent Office 2,900,440
Patented Aug. 18, 1959

2,900,440
CHROMINANCE-SIGNAL DETECTOR

John A. Rado, Flushing, N.Y., assignor to Hazeltine Research, Inc., Chicago, Ill., a corporation of Illinois Application August 31, 1954, Serial No. 453,236

1 Claim. (Cl. 178—5.4)

This invention relates to chrominance-signal detectors for color-television receivers.

To derive the chrominance-signal components of the subcarrier wave signal transmitted in accordance with color-television standards, prior chrominance-signal detectors have utilized several electron-discharge tubes. Such detectors are subject to the limitation that the circuits are, therefore, more complex and costly than may be desirable.

It is an object of the present invention, therefore, to provide a new and improved chrominance-signal detector for a color-television receiver capable of deriving all the chrominance-signal components required for the reproduction of a composite color image by means of a simplified circuit.

It is another object of the invention to provide a new and improved chrominance-signal detector for a color-television receiver capable of deriving all the necessary chrominance-signal components by means of a single electron-discharge tube.

In accordance with a particular form of the invention, a chrominance-signal detector for a color-television receiver comprises circuit means for supplying a signal carrier of chrominance signals to be detected and circuit means for supplying four quadrature phase-displaced reference signals of carrier frequency. The detector also includes an electron-discharge device comprising four electrode sections including a common central cathode and four anodes circumferentially spaced around the cathode and a common control electrode intermediate the cathode and the anodes, the control electrode being responsive to the chrominance signal carrier and the anodes being responsive to the reference signals and the frequency selective circuit means for deriving from the four anodes four components of the chrominance signals.

For a better understanding of the present invention, together with other and further objects thereof, reference is had to the following description taken in connection with the accompanying drawing, and its scope will be pointed out in the appended claim.

Referring to the drawing.

Figure 1:
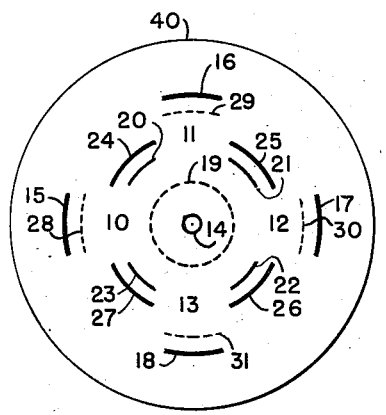
Fig. 1 is a diagrammatic sectional view of an electron-discharge device suitable for use in a chrominance-signal detector constructed in accordance with the invention.

Referring now more particularly to Fig. 1 of the drawing, the electron-discharge device there represented comprises a high vacuum tube 40 having four electrode sections 10, 11, 12, and 13 preferably including a common central cathode 14 and four collectors or anodes 15, 16, 17, 18 circumferentially spaced around the cathode. An inner control electrode 19 common to the four sections 10, 11, 12, 13 is disposed intermediate the cathode and the anodes 15, 16, 17, 18. Suitable beam-forming electrodes 20, 21, 22, 23 and accelerator electrodes 24, 25, 26, and 27 preferably are disposed between the four electrode sections 10, 11, 12, 13 to form the electron-discharge beams traveling from the cathode 14 to the anodes 15, 16, 17, 18. Four outer control electrodes 28, 29, 30, 31 are disposed intermediate the cathode 14 and anodes 15, 16, 17, 18, respectively.

Figure 1A:
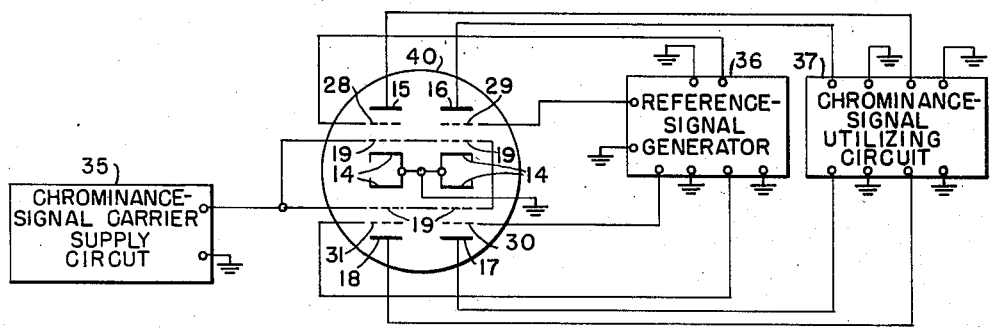
Fig. 1a is a circuit diagram of a chrominance-signal detector constructed in accordance with the invention and utilizing the Fig. 1 device.

Referring now more particularly to Fig. 1a of the drawing, a conventional chrominance-signal carrier (that is, standard modulated subcarrier) supply circuit 35 of a color-television receiver is coupled to the inner control electrode 19 and cathode 14 of the tube 40 for controlling the intensity of the cathode electron discharges of the four sections of the tube. A reference-signal generator 36 for preferably supplying four quadrature phase-displaced reference signals of chrominance-signal carrier frequency has four output circuits individually connected to the outer control electrodes 28, 29, 30, and 31. A conventional chrominance-signal utilizing circuit is connected to the four anodes of the tube and is responsive to, for example, the positive and negative in-phase components (+I, —I) and positive and negative quadrature-phase components (+Q, —Q) of the chrominance-signal carrier of the composite color-television signal. The reference-signal generator 36 may be adjusted to supply signals which render the four sections of the tube conductive during, for example, sampling intervals phase-displaced by 90° at the chrominance-signal carrier frequency. The four sections 10, 11, 12, and 13 of the tube then become successively conductive to derive by synchronous detection at the four anodes the four quadrature components of the chrominance signals for application to a conventional chrominance-signal utilizing circuit of a color-television receiver. The beam-forming electrodes 20, 21, 22, 23 and accelerator electrodes 24, 25, 26, 27 of the tube 40 have not been represented in Fig. 1a but it will be understood that they are operated at suitable potentials, for example, cathode potential and a high positive potential, respectively.

Figure 2:
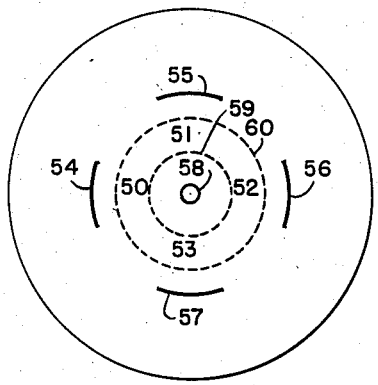
Fig. 2 is a diagrammatic sectional view of a modified form of electron-discharge device suitable for use in a chrominance-signal detector constructed in accordance with the invention.

Referring now more particularly to Fig. 2 of the drawing, the electron-discharge tube there represented has four sections 50, 51, 52, and 53 individually including four anodes 54, 55, 56, and 57, a common cathode 58, a common inner control electrode 59, and a common screen electrode 60.

Figure 3:
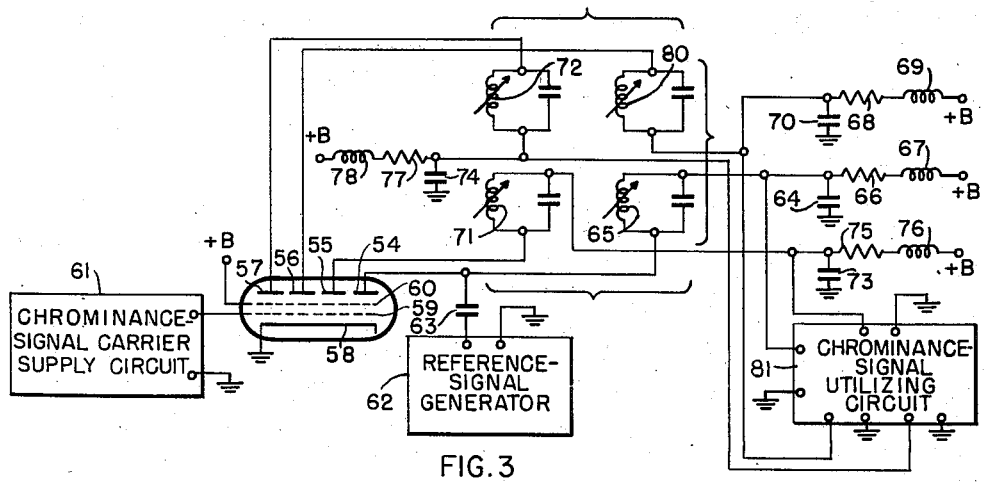
Fig. 3 is a circuit diagram of a chrominance-signal detector constructed in accordance with the invention and utilizing the Fig. 2 electron-discharge device.

Referring now to Fig. 3, a chrominance-signal carrier supply circuit 61 of conventional construction is connected to the control electrode 59 and cathode 58 while the screen electrode is connected to a suitable source +B. A conventional reference-signal generator 62 is coupled through a coupling condenser 63 and a reference-signal by-pass condenser 64 to the primary winding 65 of a transformer. One terminal of the transformer is connected to the anode 54 while the other terminal is coupled to a source of potential +B through a video-frequency load circuit comprising a resistor 66, peaking inductor 67, and condenser 64. A secondary winding 80 of the transformer is closely coupled to the winding 65 in the manner of, for example, bifilar windings for developing at a terminal thereof connected to the anode 56 a voltage which is 180° out-of-phase with the signal at the anode 54. The other terminal of the winding 80 is coupled to the source +B through a similar video-frequency load 68, 69, 70. Additional transformer windings 71, 72 connected to anodes 55 and 57, respectively, are loosely coupled to the windings 65, 80 for developing reference signals which lead the signals of windings 65, 80, respectively, by 90°. The windings 71, 72 are coupled to the source +B through video-frequency loads 73, 75, 76 and 74, 77, 78, respectively. The various transformer windings preferably are tuned to the reference-signal frequency by means of associated condensers which may be merely the inherent circuit capacitance.

Considering now the operation of the Fig. 3 chrominance-signal detector, the reference-signal generator 62 is effective to render the four sections of the tube conductive during, for example, sampling intervals phase-displaced by 90° at the reference frequency because of the application of quadrature phase-displaced signals to the anodes 54, 55, 56, 57. Thus, the anodes are utilized as control electrodes and become successively conductive during part of each chrominance-signal carrier cycle to derive, by synchronous detection, four components of the chrominance signals. The frequency-selective load networks 64, 66, 67; 73, 75, 76; 68, 69, 70; 74, 77, 78 connected to the anodes are effective to derive the four components of the chrominance signals by ohmic drop from the anode-cathode currents of the tube. These four components are applied to a suitable demodulated chrominance-signal utilizing circuit 81 which may, for example, comprise a matrix for deriving the complete color signal by mixture of chrominance and luminance components.

From the foregoing description, it will be apparent that a chrominance-signal detector constructed in accordance with the invention has the advantage that it derives four chrominance-signal components from a chrominance-signal carrier by means of a single electron-discharge tube having a simplified associated circuit.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

A chrominance-signal detector for a color-television receiver comprising: circuit means for supplying a signal carrier of chrominance signals to be detected; circuit means for supplying four quadrature phase-displaced reference signals of carrier frequency; an electron-discharge device comprising four electrode sections including a common central cathode and four anodes circumferentially spaced around said cathode and a common control electrode intermediate said cathode and said anodes, said control electrode being responsive to said chrominance-signal carrier and said anodes being responsive to said reference signals; and frequency-selective circuit means for deriving from said four anodes four components of said chrominance signals.

References Cited in the file of this patent

UNITED STATES PATENTS

| | | |
|---|---|---|
| 1,814,327 | Nicholson | July 14, 1931 |
| 2,097,306 | Rothe et al. | Oct. 26, 1937 |
| 2,153,178 | Fitch | Apr. 4, 1939 |
| 2,197,041 | Gray | Apr. 16, 1940 |
| 2,718,546 | Schlesinger | Sept. 20, 1955 |
| 2,779,818 | Adler | Jan. 29, 1957 |

OTHER REFERENCES

"Electronics," April–June 1954, pages 164–166.